(12) United States Patent
Zhou et al.

(10) Patent No.: US 10,514,812 B2
(45) Date of Patent: Dec. 24, 2019

(54) ARRAY SUBSTRATE, DISPLAY PANEL AND DRIVING METHOD

(71) Applicants: SHANGHAI TIANMA MICRO-ELECTRONICS CO., LTD., Shanghai (CN); TIANMA MICRO-ELECTRONICS CO., LTD., Shenzhen (CN)

(72) Inventors: Xingyao Zhou, Shanghai (CN); Qijun Yao, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 277 days.

(21) Appl. No.: 15/464,297

(22) Filed: Mar. 20, 2017

(65) Prior Publication Data
US 2017/0192562 A1 Jul. 6, 2017

(30) Foreign Application Priority Data
Oct. 26, 2016 (CN) .......................... 2016 1 0948410

(51) Int. Cl.
 *G06F 3/045* (2006.01)
 *G06F 3/041* (2006.01)
 *G09G 3/36* (2006.01)
(52) U.S. Cl.
 CPC .............. *G06F 3/045* (2013.01); *G06F 3/041* (2013.01); *G06F 3/0414* (2013.01);
 (Continued)
(58) Field of Classification Search
 CPC ..................... G09G 2300/0426; G09G 3/3648
 See application file for complete search history.

(56) References Cited

U.S. PATENT DOCUMENTS

2004/0239658 A1* 12/2004 Koyama .................. G09G 3/32
 345/204
2007/0176868 A1 8/2007 Lee et al.
(Continued)

FOREIGN PATENT DOCUMENTS

CN 1637812 A 7/2005
CN 101008729 A 8/2007
(Continued)

OTHER PUBLICATIONS

First Office Action for Chinese Application No. 201610948410.8 dated Feb. 28, 2019, 16 pages.

*Primary Examiner* — Nan-Ying Yang
(74) *Attorney, Agent, or Firm* — Kilpatrick Townsend & Stockton, LLP

(57) ABSTRACT

An array substrate, a display panel and a driving method are provided. The array substrate includes a substrate including a display region and a border region surrounding the display region; multiple pixel units arranged in the display region in an array; a data-line metal layer arranged in the display region, where the data-line metal layer includes multiple wiring units arranged in an array, with each wiring unit corresponding to multiple pixel units in a direction perpendicular to the substrate, and multiple pixels units corresponding to a same wiring unit being electrically connected to the wiring unit via transistors, respectively. Multiple first gate lines are arranged in parallel and extending in a row direction; and multiple second gate lines arranged in parallel and extending in a column direction. The first gate line and the second gate line are arranged to control a conduction state of the transistor.

20 Claims, 16 Drawing Sheets

(52) U.S. Cl.
CPC . *G09G 3/3648* (2013.01); *G06F 2203/04105* (2013.01); *G09G 3/3659* (2013.01); *G09G 3/3677* (2013.01); *G09G 2300/0426* (2013.01); *G09G 2310/067* (2013.01)

(56) References Cited

U.S. PATENT DOCUMENTS

| | | |
|---|---|---|
| 2011/0063280 A1 | 3/2011 | Lee et al. |
| 2015/0145806 A1 | 5/2015 | Chen et al. |
| 2015/0212634 A1* | 7/2015 | Pyun ............... G06F 3/0412 345/173 |
| 2015/0220208 A1* | 8/2015 | Noguchi ............ G06F 3/0412 345/174 |
| 2016/0163633 A1* | 6/2016 | Jeong ............ G02F 1/136286 345/204 |
| 2016/0267862 A1 | 9/2016 | Yao et al. |
| 2017/0031223 A1 | 2/2017 | Xue et al. |
| 2017/0038890 A1* | 2/2017 | Ma .................. G06F 3/0412 |

FOREIGN PATENT DOCUMENTS

| | | |
|---|---|---|
| CN | 104062820 A | 9/2014 |
| CN | 104678628 A | 6/2015 |
| CN | 104795043 A | 7/2015 |
| CN | 206039108 U | 3/2017 |
| JP | H09159995 H | 6/1997 |

\* cited by examiner

ARRAY SUBSTRATE, DISPLAY PANEL AND DRIVING METHOD

CROSS REFERENCE OF RELATED APPLICATION

This application claims the priority to Chinese Patent Application No. 201610948410.8, entitled "ARRAY SUBSTRATE, DISPLAY PANEL AND DRIVING METHOD", filed with the Chinese State Intellectual Property Office on Oct. 26, 2016, which is incorporated herein by reference in its entirety.

FIELD

The present disclosure relates to the technical field of a display device, and in particular to an array substrate, a display panel and a driving method.

BACKGROUND

With continuous development of science technology, more and more electronic device including a display panel are widely applied in people's daily life and work, and bring great convenience for people's daily life and work and become an indispensable tool for people's life.

In a conventional display panel, most of data lines are numerical strip-shaped data lines, and cannot perform block driving display in cooperation with a LED light. Also, the conventional display panel only has a touch position detection function, and does not have a pressure detection function. In order to realize the pressure detection function, a pressure detection sensor or two layers of pressure detection electrodes are normally provided in the display panel in the conventional technology, and pressure is detected based on a capacitance change in the pressure detection electrode due to pressure.

It can be seen that the conventional display panel cannot perform block display, and the pressure detection sensor or the pressure detection electrode is additionally provided in the display panel to realize the pressure detection, which increases the thickness of the display panel and production cost.

SUMMARY

In order to solve the issues described above, the present disclosure provides an array substrate, a display panel and a driving method, for performing block display without causing additional power consumption, and reusing a data-line metal layer to realize pressure detection without providing the pressure sensor or the pressure detection electrode, thereby reducing the thickness of the display panel and the production cost.

In order to achieve the object described above, the present disclosure provides technical solutions as follows.

An array substrate is provided, which includes a substrate including a display region and a border region surrounding the display region. The array substrate further includes multiple pixel units arranged in the display region in an array, and a data-line metal layer arranged in the display region. The data-line metal layer includes multiple wiring units arranged in an array. Each wiring unit corresponds to multiple of the pixel units in a direction perpendicular to the substrate, and multiple pixels units corresponding to a same wiring unit are electrically connected to the wiring unit via transistors, respectively. The array substrate further includes multiple first gate lines arranged in parallel and extending in a row direction, and multiple second gate lines arranged in parallel and extending in a column direction. The first gate lines and the second gate lines are arranged to control conduction states of the transistors.

A display panel is further provided in the present disclosure, which includes the array substrate described above.

A driving method applied to the array substrate described above is further provided in the present disclosure. The driving method includes in a display phase, controlling a preset transistor to be switched on by the first gate line and the second gate line, inputting a data signal to the wiring unit, and charging a pixel unit electrically connected to the preset transistor.

With the array substrate, the display panel and the driving method provided by the technical solutions of the present disclosure, the first gate line and the second gate line are arranged to control the conduction state of the transistor. In a case that the transistor connected to the wiring unit is switched on, the wiring unit is arranged to provide a data signal to the pixel unit connected to the wiring unit, for realizing image display. In addition, the wiring unit is further arranged to perform pressure detection, and in a case that the transistor connected to the wiring unit is switched off, the wiring unit is arranged to input a direct-current voltage signal and output an electric signal, for realizing pressure detection. It can be seen in the technical solutions of the present disclosure that the conduction state of the transistor is controlled by the first gate line and the second gate line, thereby achieving block display, and a data line in a preset shape is reused to perform pressure detection without additionally providing the pressure sensor or the pressure detection electrode, thereby reducing the thickness of the display panel and the production cost.

BRIEF DESCRIPTION OF THE DRAWINGS

In order to more clearly illustrate the technical solution in the embodiments of the present invention or in the conventional technology, in the following, drawings required in the description of the embodiments or the conventional technology will be introduced simply. Obviously, the drawings in the following description are some embodiments of the present invention. For those skilled in the art, other drawings can also be obtained according to the drawings without any creative work.

DETAILED DESCRIPTION OF EMBODIMENTS

Figure 1:
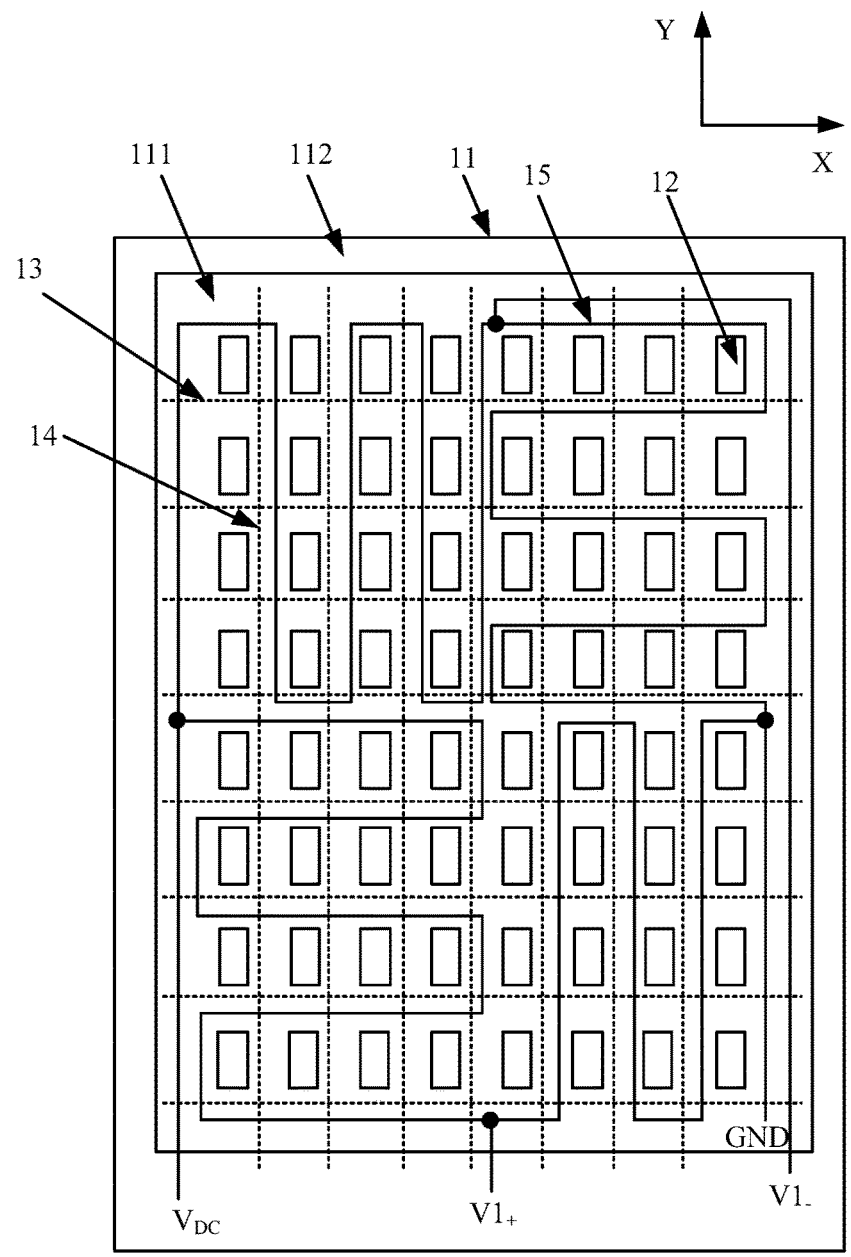
FIG. 1 is a schematic structural diagram of an array substrate according to an embodiment of the present invention.

Hereinafter, the technical solutions in the embodiments of the present invention will be described clearly and completely in conjunction with the drawings in the embodiments of the present invention. Obviously, the described embodiments are only a part of the embodiments of the present invention, but not all the embodiments. All the other embodiments obtained by those skilled in the art based on the embodiments of the present invention without creative work will fall within the scope of protection of the present disclosure.

As described in the background part, the pressure detection sensor or the pressure detection electrode is additionally provided in the conventional display panel to realize pressure detection, which increases the thickness of the display panel and the production cost.

In order to solve the issues described above, an array substrate is provided according to an embodiment of the present invention. The array substrate is applied to a display panel, and the array substrate includes a substrate including a display region and a border region surrounding the display region. The array substrate further includes multiple pixel units arranged in the display region in an array, and a data-line metal layer arranged in the display region. The data-line metal layer includes multiple wiring units arranged in an array. Each wiring unit corresponds to multiple of the pixel units in a direction perpendicular to the substrate, and multiple pixels units corresponding to a same wiring unit are electrically connected to the wiring unit via transistors, respectively. The array substrate further includes multiple first gate lines arranged in parallel and extending in a row direction, and multiple second gate lines arranged in parallel and extending in a column direction. The first gate line and the second gate line are arranged to control a conduction state of the transistor.

With the array substrate according to the embodiment of the present invention, the first gate line and the second gate line are arranged perpendicularly with each other, to control a conduction state of the transistor. In a case that the transistor connected to the wiring unit is switched on, the wiring unit is arranged to provide a data signal to the pixel unit connected to the wiring unit, for realizing image display. The wiring unit is further arranged to perform pressure detection. In a case that the transistor connected to the wiring unit is switched off, the wiring unit is arranged to input a direct-current voltage signal, and output an electric signal, for realizing pressure detection. The conduction state of the transistor is controlled by the first gate line and the second gate line in the array substrate, a data line in a preset shape is reused to perform pressure detection without additionally providing the pressure sensor or the pressure detection electrode, thereby reducing the thickness of the display panel and the production cost. In addition, blocking is performed on the data-line metal layer, for realizing a block display function.

In order to make the technical solutions according to the embodiments of the present invention clearer, the technical solutions described above are described in detail below in conjunction with the drawings.

With reference to FIG. 1, which is a schematic structural diagram of an array substrate according to an embodiment of the present invention, the array substrate includes a substrate 11 including a display region 111 and a border region 112 surrounding the display region 111. The array substrate further includes multiple pixel units 12 arranged in a display region 111 in an array. The array substrate further includes a data-line metal layer 15 arranged in the display region 111. The data-line metal layer 15 includes multiple wiring units arranged in an array. The array substrate further includes multiple first gate lines 13 arranged in parallel and extending in a row direction X; and multiple second gate lines 14 arranged in parallel and extending in a column direction Y. Each wiring unit corresponds to multiple pixel units 12 in a direction perpendicular to the substrate 11, and multiple pixel units 12 corresponding to a same wiring unit are electrically connected to the wiring unit via transistors, respectively.

Specifically, the first gate line 13 and the second gate line 14 are arranged to control a conduction state of the transistor.

In a case that the transistor connected to the wiring unit is switched on, the wiring unit is arranged to provide a data signal to the pixel unit connected to the wiring unit, for realizing image display. It should be noted that the wiring unit can be used for pressure touch in addition to display. In a case that the transistor connected to the wiring unit is switched off, that is, the wiring unit does not provide the data signal to the pixel unit connected to the wiring unit, the wiring unit is arranged to input a direct-current voltage signal, and output an electric signal, for realizing pressure detection.

It should be noted that, the transistor is not shown in FIG. 1. For ease of illustration, only one wiring unit is shown in the embodiment shown in FIG. 1. The number of wiring units in the array substrate may be set based on the number of pixel units 12 in the array substrate, which is not limited here. In the array substrate, the first gate lines 13 intersect with the second gate lines 14 in an insulative manner.

In a display phase, the first gate line 13 and the second gate line 14 receive scanning signals to control the transistor to be switched on, and the wiring unit is arranged to input a data signal to charge the pixel unit electrically connected to the transistor, for realizing image display.

In addition, the wiring unit may further include a pressure sensing phase for detecting pressure.

In the pressure sensing phase, the first gate line 13 and the second gate line 14 control the transistor to be switched off, the wiring unit is arranged to input a direct-current voltage signal, and pressure detection is performed based on an electric signal outputted from the wiring unit.

Figure 2:
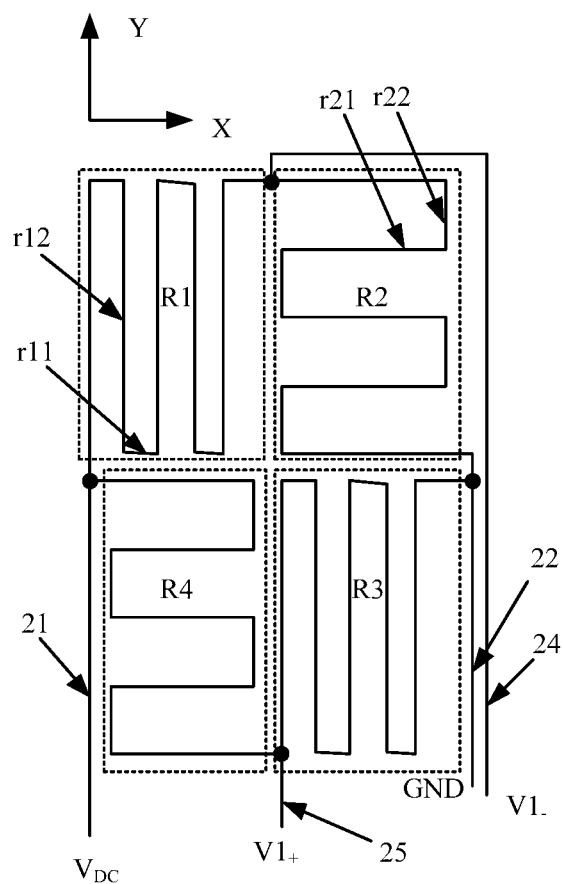
FIG. 2 is a schematic diagram of an electrode structure of a wiring unit in the array substrate shown in FIG. 1.

The wiring unit is illustrated now in conjunction with FIG. 1 and FIG. 2. The wiring unit includes first data lines r11 extending in a row direction X and second data lines r12 extending in a column direction, and the first data line r11 and the second data line r12 are electrically connected alternately. The wiring units described above are arranged in a snake shape, thereby performing block display.

Figure 3:
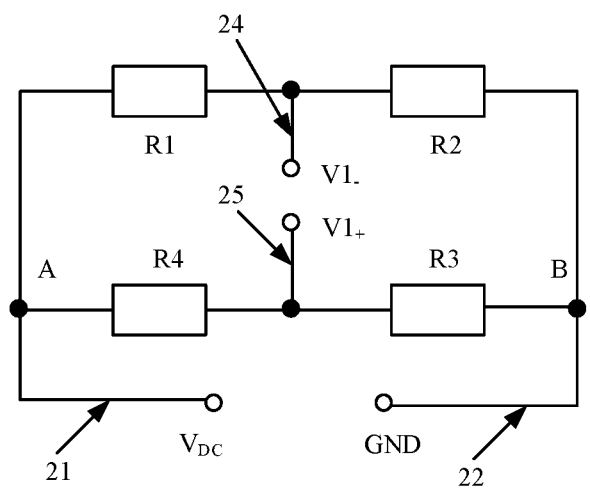
FIG. 3 is an equivalent circuit diagram of a wiring unit as shown in FIG. 2.

In the array substrate shown in FIG. 1, the wiring unit may also be reused for pressure touch. An electrode structure of the wiring unit is shown in FIG. 2, which is a schematic diagram of an electrode structure of the wiring unit in the array substrate shown in FIG. 1. An equivalent circuit of the wiring unit is shown in FIG. 3, which is an equivalent circuit diagram of the wiring unit shown in FIG. 2.

The wiring unit includes a bridge electrode, a power supply terminal and a detection terminal. The array substrate further includes a power supply line electrically connected to the power supply terminal and a detection line electrically connected to the detection terminal. Multiple pixel units corresponding to each wiring unit are electrically connected to the bridge electrode via transistors.

In FIG. 2, each dash-line block indicates a sub-bridge electrode. Specifically, the bridge electrode includes a first sub-bridge electrode R1, a second sub-bridge electrode R2, a third sub-bridge electrode R3 and a fourth sub-bridge electrode R4.

The wiring unit includes two power supply terminals and two detection terminals. Each of the power supply terminals is connected to a respective power supply line. And each of the detection terminals is connected to a respective detection line.

As shown in FIG. 2 and FIG. 3, the power supply line includes a first power supply line 21 and a second power supply line 22. The detection line includes a first detection line 25 and a second detection line 24. The first sub-bridge electrode R1 and the second sub-bridge electrode R2 connected in series are electrically connected between the first power supply line 21 and the second power supply line 22. The third sub-bridge electrode R3 and the fourth sub-bridge electrode R4 connected in series are electrically connected between the first power supply line 21 and the second power supply line 22.

The first detection line 25 is electrically connected between the third sub-bridge electrode R3 and the fourth sub-bridge electrode R4. The second detection line 24 is electrically connected between the first sub-bridge electrode R1 and the second sub-bridge electrode R2.

Each of the first sub-bridge electrode R1, the second sub-bridge electrode R2, the third sub-bridge electrode R3 and the fourth sub-bridge electrode R4 includes multiple first data lines extending in the row direction X and multiple second data lines extending in the column direction Y. In a same sub-bridge electrode, the first data lines and the second data lines are electrically connected alternately.

The four sub-bridge electrodes in a same bridge electrode are arranged in an array of 2×2. In a same bridge electrode, all the second data lines of one of any two adjacent sub-bridge electrodes are arranged in parallel sequentially in the row direction X, with each of the first data lines being arranged to electrically connect two adjacent second data lines in the row direction X together, and all of the first data lines of the other of the any two adjacent sub-bridge electrodes are arranged in parallel sequentially in the column direction Y, with each of the second data lines being arranged to electrically connect two adjacent first data lines in the column direction Y together, so that pressure sensing directions of any two adjacent sub-bridge electrodes are different from each other.

For example, for the first sub-bridge electrode R1 and the second sub-bridge electrode R2, all second data lines r12 of the first sub-bridge electrode R1 are arranged in parallel sequentially in the row direction X, with each first data line r11 of the first sub-bridge electrode R1 being arranged to connect two adjacent second data lines r12 in the row direction X together, and all first data lines r21 of the second sub-bridge electrode R2 are arranged in parallel sequentially in the column direction Y, with each second data line r22 of the second sub-bridge electrode R2 being arranged to connect two adjacent first data lines r21 in the column direction Y together, so that pressure sensing directions of the first sub-bridge electrode R1 and the second sub-bridge electrode R2 are different from each other.

In a pressure sensing phase, the first power supply line 21 is arranged to provide a direct-current voltage $V_{DC}$, and the second power supply line 22 is used as a ground terminal GND. In this case, a preset direct-current voltage signal is inputted to the wiring unit, so that electric signals are outputted from the first detection line 25 and the second detection line 24, to perform pressure detection.

In a case that the array substrate according to the embodiment is under pressure, as shown in FIG. 3, an equivalent circuit of the wiring unit is a Wheatstone bridge. Four sub-bridge electrodes are deformed under the pressure, and therefore, resistance values of the four sub-bridge electrodes change. Electric signals are outputted from the first detection line 25 and the second detection line 24. A voltage $V1_+$ of the first detection line 25 and a voltage $V1_-$ of the second detection line change compared with a voltage of the first detection line 25 and a voltage of the second detection line under no pressure. The greater the pressure is, the greater the deformation of each sub-bridge electrode is, and the greater the change in the resistance value is, so that there is a function relation between a change in the electric signal and the size of pressure. Therefore, a pressure value on the array substrate can be measured by measuring the electric signal. For example, multiple electric signals outputted from the first detection line 25 and the second detection line 24 can be measured in a case of different known pressure values, a curve of the function relation can be determined in a way such as linear fitting, and a pressure value corresponding to the electric signal can be obtained based on the curve, thereby realizing pressure detection.

Figure 4:
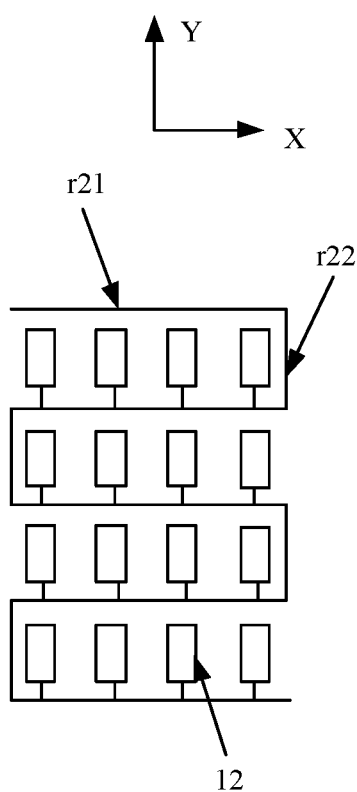
FIG. 4 is a schematic diagram of a connection structure between a sub-bridge electrode and a pixel unit according to an embodiment of the present invention.
Figure 5:
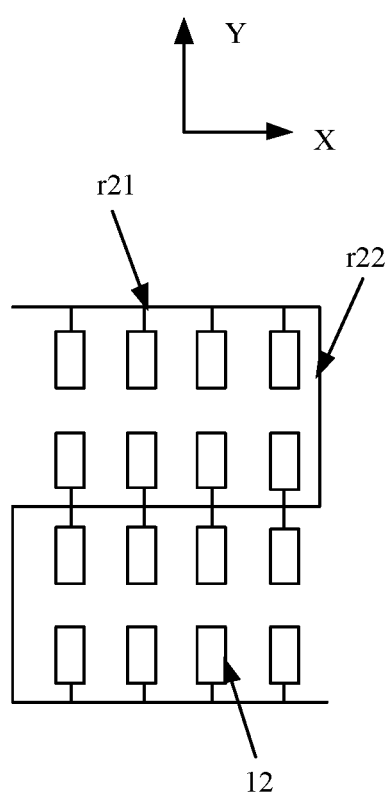
FIG. 5 is a schematic diagram of a connection structure between a sub-bridge electrode and a pixel unit according to an embodiment of the present invention.

In an array of pixel units corresponding to a same sub-bridge electrode, at least one row of pixel units are arranged between two adjacent first data lines in the column direction in a case that all the first data lines are arranged in parallel sequentially in the column direction, as shown in FIG. 4 and FIG. 5.

As shown in FIG. 4, which is a schematic diagram of a connection structure between the sub-bridge electrode and the pixel unit according to an embodiment of the present invention, in an array of pixel units corresponding to a same sub-bridge electrode, one row of pixel units 12 are arranged between two adjacent first data lines r21 in the column direction Y in a case that all the first data lines r21 are arranged in parallel sequentially in a column direction Y. The first data line r21 is electrically connected to the pixel units via transistors (not shown). FIG. 4 shows a way of electrically connecting the each first data line r21 with a previous row of pixel units via transistors (not shown). In another embodiment of the present invention, each first data line r21 may also be electrically connected to a next row of pixel units via transistors (not shown).

As shown in FIG. 5, which is a schematic diagram of another connection structure between the sub-bridge electrode and the pixel unit according to an embodiment of the present invention, in an array of pixel units corresponding to a same sub-bridge electrode, two rows of pixel units 12 are arranged between two adjacent first data lines r21 in the column direction Y in a case that all the first data lines r21 are arranged in parallel sequentially in the column direction Y. The first data line r21 is electrically connected to the pixel units via transistors (not shown). The first data line r21 is electrically connected to a previous row of pixel units and a next row of pixel units via transistors (not shown), respectively.

Figure 6:
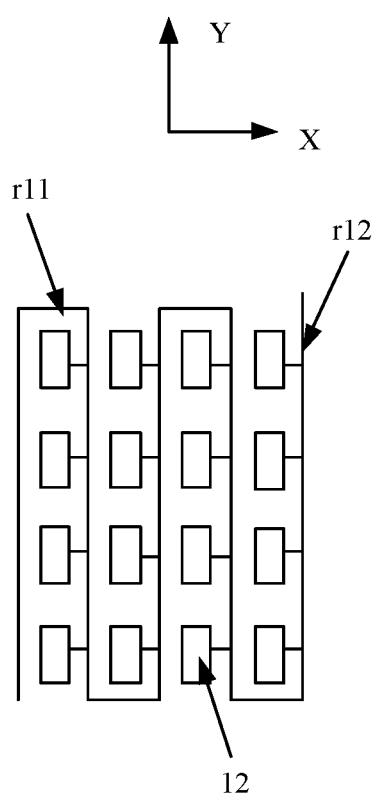
FIG. 6 is a schematic diagram of a connection structure between a sub-bridge electrode and a pixel unit according to an embodiment of the present invention.
Figure 7:
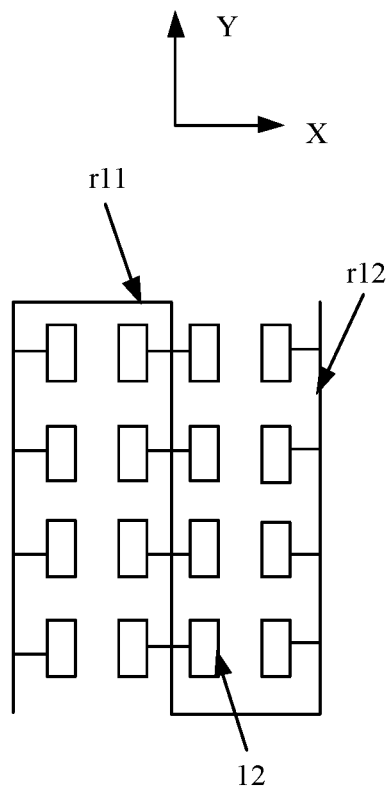
FIG. 7 is a schematic diagram of a connection structure between a sub-bridge electrode and a pixel unit according to an embodiment of the present invention.

In an array of pixel units corresponding to a same sub-bridge electrode, at least one column of pixel units are arranged between two adjacent second data lines in the row direction in a case that all the second data lines are arranged in parallel sequentially in the row direction, as shown in FIG. 6 and FIG. 7.

As shown in FIG. 6, which is a schematic diagram of another connection structure between the sub-bridge electrode and the pixel unit according to an embodiment of the present invention, in a same sub-bridge electrode, one column of pixel units 12 in the array of pixel units are arranged between two adjacent second data lines r12 in the row direction X in a case that all the second data lines r12 are arranged in parallel sequentially in the row direction X. The second data line r22 is electrically connected to the pixel units via transistors (not shown). FIG. 6 shows a way of electrically connecting each second data line r22 with a previous column of pixel units (on left side) via transistors (not shown). In another embodiment of the present invention, each second data line r22 may also be connected to a next column of pixel units (on right side) via transistors (not shown).

As shown in FIG. 7, which is a schematic diagram of another connection structure of the sub-bridge electrode and the pixel unit according to an embodiment of the present invention, in a same sub-bridge electrode, two columns of pixel units 12 in the array of pixel units are arranged between two adjacent second data lines r12 in the row direction X in a case that all the second data lines r12 are arranged in parallel sequentially in the row direction X. The second data line r22 is electrically connected to the pixel units via transistors (not shown). The second data line r22 is electrically connected to a previous column of pixel units (on left side) and a next column of pixel units (on right side) via transistors (not shown), respectively.

In a display phase, the first gate line and the second gate line control the transistor of the wiring unit to be switched on, potential of the first power supply line 21 and potential of the second power supply 22 are floated, and the first detection line 25 and/or the second detection line 24 are used to provide a data signal to the pixel unit, for realizing image display.

Figure 8:
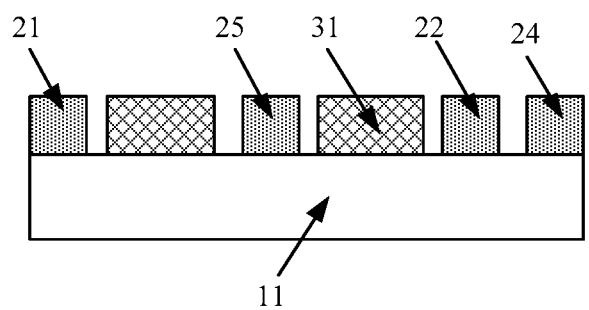
FIG. 8 is a schematic structural diagram of an array substrate according to an embodiment of the present invention.

With reference to FIG. 8, which is a schematic structural diagram of another array substrate according to an embodiment of the present invention, in the array substrate, each of the first power supply line 21, the second power supply line 22, the first detection line 25 and the second detection line 24 is arranged in the data-line metal layer. That is, the first power supply line 21, the second power supply line 22, the first detection line 25 and the second detection line 24 are arranged in a same layer as an electrode line 31 of the bridge electrode. It should be noted that, only the substrate 11 and an electrode pattern arranged in the data-line metal layer are shown in FIG. 8 for ease of illustration.

In another embodiment, a wiring metal layer may also be provided. At least one of the first power supply line, the second power supply line, the first detection line and the second detection line is arranged in the wiring metal layer, and is electrically connected to the wiring unit via a via hole.

Figure 9:
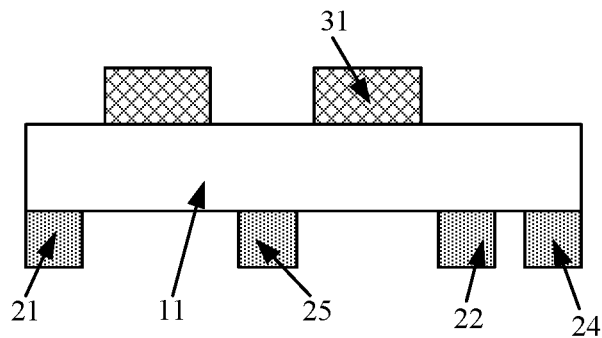
FIG. 9 is a schematic structural diagram of an array substrate according to an embodiment of the present invention.

As shown in FIG. 9, which is a schematic structural diagram of another array substrate according to an embodiment of the present invention, the first power supply line 21, the second power supply line 22, the first detection line 25 and the second detection line 24 may be arranged in a wiring metal layer on a side of the substrate 11 facing away from the data-line metal layer. In the embodiment, an aperture ratio is improved, for ease of layout for the power supply line and the detection line of each wiring unit.

In the embodiment shown in FIG. 9, the wiring metal layer is arranged on a surface of the substrate 11 facing away from the pixel unit, and the substrate 11 is reused as an insulating layer, to prevent the wiring metal layer and the other metal layer of the array substrate from being shorted. It should be noted that, only the substrate 11, an electrode pattern in the data-line metal layer and the wiring metal layer are shown in FIG. 9, for ease of illustration. The detection line or the power supply line in the wiring metal layer is electrically connected to the wiring unit via a via hole through the substrate 11. Since a connection relation between the via hole and the detection line or the power supply line cannot be shown in FIG. 9, the via hole is not shown in FIG. 9.

As described above, more than one wiring unit may be arranged in the array substrate. The larger the size of the display panel is, the more the pixel units are, and many wiring units should be arranged. In a case that multiple wiring units are arranged, power supply lines of all wiring units are electrically connected together. In this way, the array substrate including multiple wiring units can implement pressure detection by one direct-current voltage $V_{DC}$ and one ground terminal GND when performing pressure detection. Each wiring unit performs pressure detection independently, and therefore, detection sections of the wiring units are independent.

In an embodiment of the present invention, each first gate line is electrically connected to pixel units in a same row correspondingly, and each second gate line is electrically connected to pixel units in a same column correspondingly.

Figure 10:
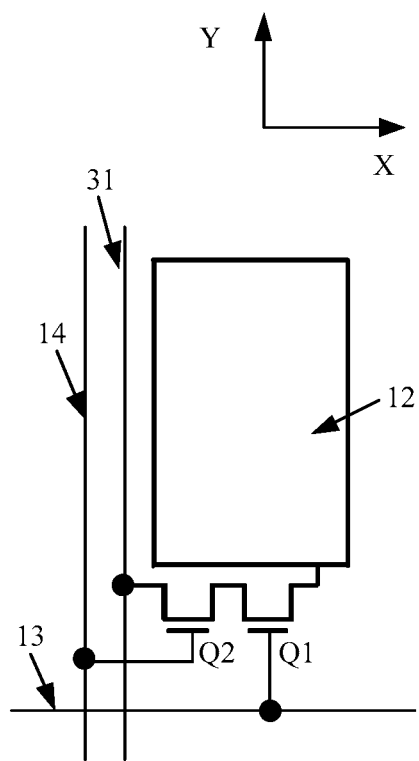
FIG. 10 is a schematic diagram of a circuit connection relation of a pixel unit, a gate line, a data line and a transistor according to an embodiment of the present invention.

As shown in FIG. 10, which is a schematic diagram of a circuit connection relation of the pixel unit, the gate line, the data line and the transistor according to an embodiment of the present invention, the transistor connected to each pixel unit 12 includes a first transistor Q1 and a second transistor Q2. Each of the first transistor Q1 and the second transistor Q2 is an MOS transistor (metal oxide semiconductor field effect transistor), and has a first electrode, a second electrode and a gate.

The first electrode of the first transistor Q1 is electrically connected to the first electrode of the second transistor Q2. The second electrode of the first transistor Q1 is electrically connected to the pixel unit 12. The second electrode of the second transistor Q2 is connected to the bridge electrode, that is, the second electrode of the second transistor Q2 is electrically connected to the electrode line 31 of the bridge electrode. Specifically, the first gate line 13 is electrically connected to the gate of the first transistor Q1, and the second gate line 14 is electrically connected to the gate of the second transistor Q2.

FIG. 10 shows a schematic diagram showing a connection relation between the pixel unit 12 and the electrode line 31 of the bridge electrode via the first transistor Q1 and the second transistor Q2 in a case that the electrode line 31 of the bridge electrode is parallel to the column direction Y.

Figure 11:
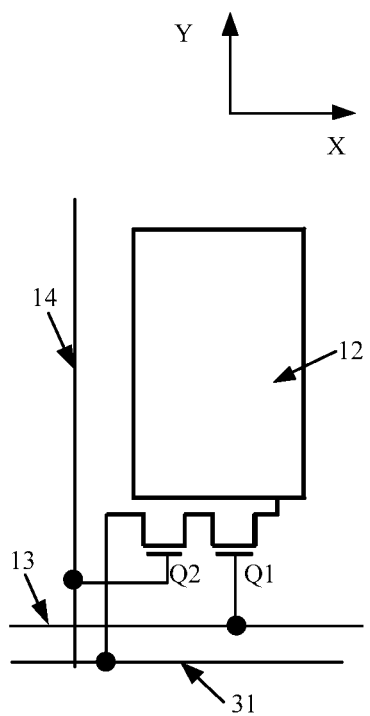
FIG. 11 is a schematic diagram of a circuit connection relation of a pixel unit, a gate line, a data line and a transistor according to an embodiment of the present invention.

Referring to FIG. 11, which is a schematic diagram of a circuit connection relation of the pixel unit, the gate line, the data line and the transistor according to an embodiment of the present invention, a connection relation is shown between the pixel unit 12 and the electrode line 31 of the bridge electrode via the first transistor Q1 and the second transistor Q2 in a case that the electrode line 31 of the bridge electrode is parallel to the row direction X.

In an embodiment of the present invention, the first gate line is insulated from the second gate line in an intersection position by a span bridge structure. In this case, a position relation between the first gate line and the second gate line may be as shown in FIG. 12 and FIG. 13.

Figure 12:
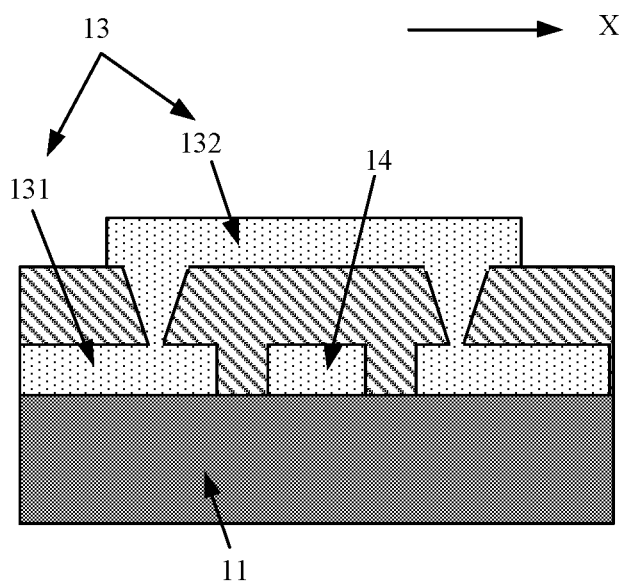
FIG. 12 is a schematic diagram of a position relation between a first gate line and a second gate line according to an embodiment of the present invention.

Reference is made to FIG. 12, which is a schematic diagram of a position relation between the first gate line and the second gate line according to an embodiment of the present invention. FIG. 12 is a sectional diagram, in which a section is perpendicular to the second gate line 14 and is parallel to the first gate line 13. The second gate line 14 is arranged in the gate-line metal layer. The first gate line 13 includes a first span bridge 132 arranged in a position where the first gate line 13 intersects with the second gate line 14, and first leads 131 on two sides of the second gate line 14 in the row direction X.

Specifically, the first lead 131 is arranged in the gate-line metal layer, and the first span bridge 132 is arranged to connect the first leads 131 on two sides of the second gate line 14 together. The first span bridge 132 is arranged in the data-line metal layer, and the first span bridge 132 is manufactured without providing the metal layer.

Figure 13:
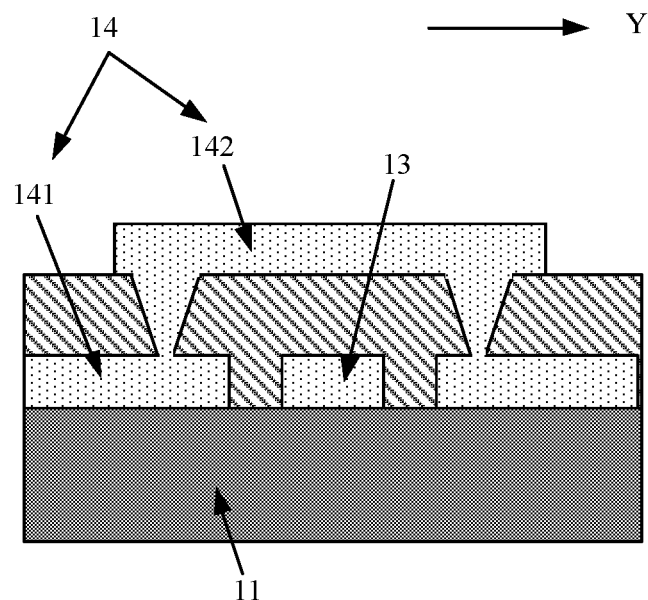
FIG. 13 is a schematic diagram of a position relation between a first gate line and a second gate line according to an embodiment of the present invention.

Reference is made to FIG. 13, which is a schematic diagram of another position relation between the first gate line and the second gate line according to an embodiment of the present invention. FIG. 13 is a sectional diagram, in which a section is perpendicular to the first gate line 13 and is parallel to the second gate line 14. The first gate line 13 is arranged in the gate-line metal layer. The second gate line 14 includes a second span bridge 142 arranged in a position where the first gate line 13 intersects with the second gate line 14, and second leads 141 arranged on two sides of the first gate line 13 in the column direction Y.

Specifically, the second lead 141 is arranged in the gate-line metal layer, and the second span bridge 142 is arranged to connect the second leads 141 on two sides of the same first gate line 13 together. The second span bridge 142 is arranged in the data-line metal layer, and the second span bridge is manufactured without providing the metal layer.

It should be noted that only the substrate 11, the first gate line 13, the second gate line 14 and an insulating layer below the span bridge structure are shown in FIG. 12 and FIG. 13, and no other structure is shown in FIG. 12 and FIG. 13, for ease of illustration.

In an embodiment of the present invention, a metal layer may be provided to insulate the first gate line from the second gate line in a position where the first gate line intersects with the second gate line. In this case, a position relation between the first gate line and the second gate line may be as shown in FIG. 14 and FIG. 15.

Figure 14:
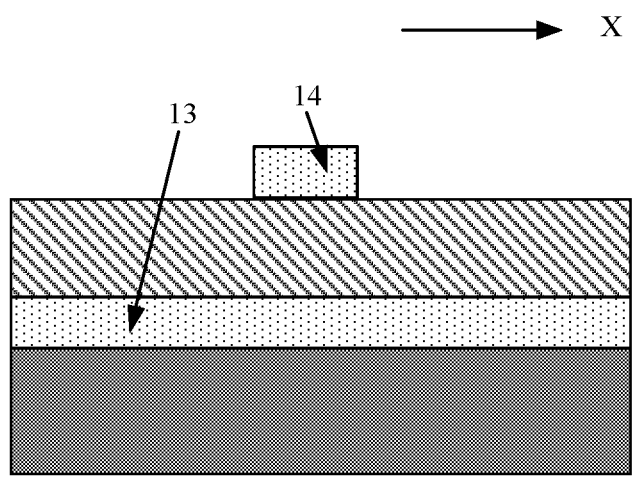
FIG. 14 is a schematic diagram of a position relation between a first gate line and a second gate line according to an embodiment of the present invention.

Reference is made to FIG. 14, which is a schematic diagram of another position relation between the first gate line and the second gate line according to an embodiment of the present invention. FIG. 14 is a sectional diagram, in which a section is perpendicular to the second gate line 14 and is parallel to the first gate line 13. In this case, the first gate line 13 is arranged in the gate-line metal layer, and a first metal layer is provided. The second gate line 14 is arranged in the first metal layer, and the first metal layer is insulated from the gate-line metal layer and the data-line metal layer.

Figure 15:
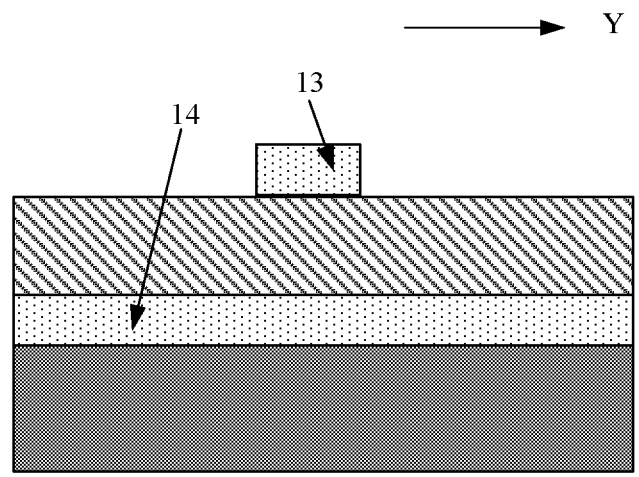
FIG. 15 is a schematic diagram of a position relation between a first gate line and a second gate line according to an embodiment of the present invention.

Reference is made to FIG. 15, which is a schematic diagram of another position relation between the first gate line and the second gate line according to an embodiment of the present invention. FIG. 15 is a sectional diagram, in which a section is perpendicular to the first gate line 13 and is parallel to the second gate line 14. In this case, the second gate line 14 is arranged in the gate-line metal layer, and a first metal layer is provided. The first gate line 13 is arranged in the first metal layer, the second gate line 14 is arranged in the gate-line metal layer, and the first metal layer is insulated from the gate-line metal layer and the data-line metal layer.

It can be known from the above that, in the array substrate according to the embodiment of the present invention, the first gate line and the second gate line are arranged perpendicularly with each other, to control a conduction state of the transistor. In a case that the transistor connected to the wiring unit is switched on, the wiring unit is arranged to provide a data signal to the pixel unit connected to the wiring unit, for realizing image display. In a case that the transistor connected to wiring unit is switched off, the wiring unit is arranged to input a direct-current voltage signal, and output an electric signal, for realizing pressure detection. The conduction state of the transistor is controlled by the first gate line and the second gate line in the array substrate, a data line in a preset shape is reused to perform pressure detection without additionally providing the pressure sensor or the pressure detection electrode, thereby reducing the thickness of the display panel and the production cost.

Figure 16:
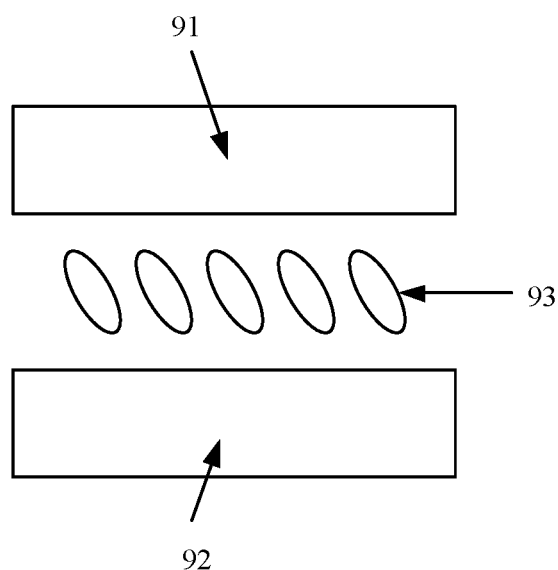
FIG. 16 is a schematic structural diagram of a display panel according to an embodiment of the present invention.

Based on the embodiment of the array substrate described above, a display panel is further provided according to another embodiment of the present invention. The display panel is shown in FIG. 16, which is a schematic structural diagram of a display panel according to an embodiment of the present invention. The display panel includes the array substrate 92 according to the embodiment described above. The display panel is a liquid-crystal display panel, and includes a color film substrate 91 arranged oppositely with respect to the array substrate 92, and a liquid crystal layer arranged between the array substrate 92 and the color film substrate 91.

The array substrate described above is applied in the display panel, and therefore the display panel can perform pressure detection without providing the pressure sensor or the pressure detection electrode, thereby reducing the thickness of the display panel and the production cost.

Based on the embodiment of the array substrate described above, a driving method is further provided according to another embodiment of the present invention. The driving method is applied to the display panel and the array substrate described above. The driving method includes controlling, in a pressure sensing phase, all transistors to be switched off by the first gate lines and the second gate lines, inputting a direct-current voltage signal to the wiring unit, and performing pressure detection based on an electric signal outputted from the wiring unit.

Specifically, in the pressure sensing phase, a first voltage signal is provided to the first gate line and all second gate lines, so that all transistors are switched off, a direct-current voltage signal is inputted to the wiring unit, and pressure detection is performed based on an electric signal outputted from the wiring unit.

In a display phase, a preset transistor is controlled to be switched on by the first gate line and the second gate line, to input a data signal to the wiring unit, and charge a pixel unit electrically connected to the preset transistor.

Specifically, in the display phase, all first gate lines are scanned according to a preset scanning sequence. In a time sequence period for scanning any one of the first gate lines, all second gate lines are scanned according to a preset scanning sequence.

Alternatively, in the display phase, all second gate lines are scanned according to a preset scanning sequence. In a time sequence period for scanning any one of the second gate lines, all first gate lines are scanned according to a preset scanning sequence.

Figure 17:
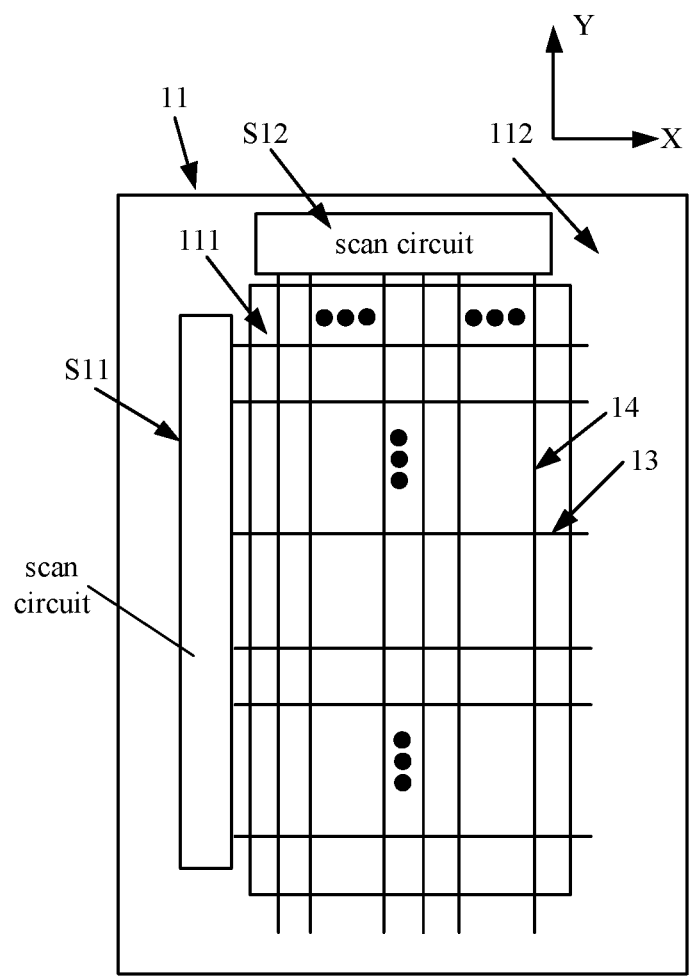
FIG. 17 is a schematic structural diagram of an array substrate according to an embodiment of the present invention.

In order to implement the driving method, the driving circuit may be as shown in FIG. 17, which is a schematic structural diagram of another array substrate according to an embodiment of the present invention. The array substrate includes a scanning circuit S11 and a scanning circuit S12 arranged in the border region 112 of the substrate 11. The scanning circuit S11 is connected to the first gate line 13, and the scanning circuit S12 is connected to the second gate line 14. The scanning circuit S11 and the scanning circuit S12 are arranged in the border region 112 at the two adjacent sides of the display region 111.

In a pressure sensing phase, the scanning circuit S11 provides, to all first gate lines 13, voltage signals for controlling the transistors to be switched off, and the scanning circuit S12 provides, to all second gate lines 14, voltage signals for controlling the transistors to be switched off. In this case, transistors corresponding to all pixel units in the display region 111 are switched off, and each of the pixel units is insulated from the wiring unit. In this case, a direct-current voltage signal is inputted to the wiring unit, and pressure detection is performed based on an electric signal outputted from the wiring unit. In the embodiments of the circuit connection structure shown in FIG. 10 and FIG. 11, the driving manner in the pressure sensing phase is not limited to the manner here. In order to realize pressure detection, the electrode line 31 of the bridge electrode and the pixel unit 12 are disconnected as long as one of the first transistor Q1 and the second transistor Q2 is switched off. Therefore, in another embodiment, for any pixel unit 12, one of the first transistor Q1 and the second transistor Q2 is controlled to be switched off by a scanning signal of the first gate line 13 and the second gate line 14.

Assumed that the array substrate includes N first gate lines 13, and M second gate lines 14, where each of M and N is a positive integer greater than 1.

In the display phase, the first gate lines 13 are scanned at first by the scanning circuit S11, and the second gate lines 14 are scanned by the scanning circuit S12 based on scanning states of the first gate lines 13, thereby charging the pixel unit.

Assumed that the N first gate lines 13 include a gate line X1 to a gate line XN in a direction opposite to the column direction Y, and the M second gate lines 14 include a gate line Y1 to a gate line YM in a row direction X. In this case, a waveform diagram of scanning time sequence of the driving method in the display phase is as shown in FIG. 18, which is a waveform diagram of scanning time sequence in a display phase according to the embodiment of the present invention.

Figure 18:
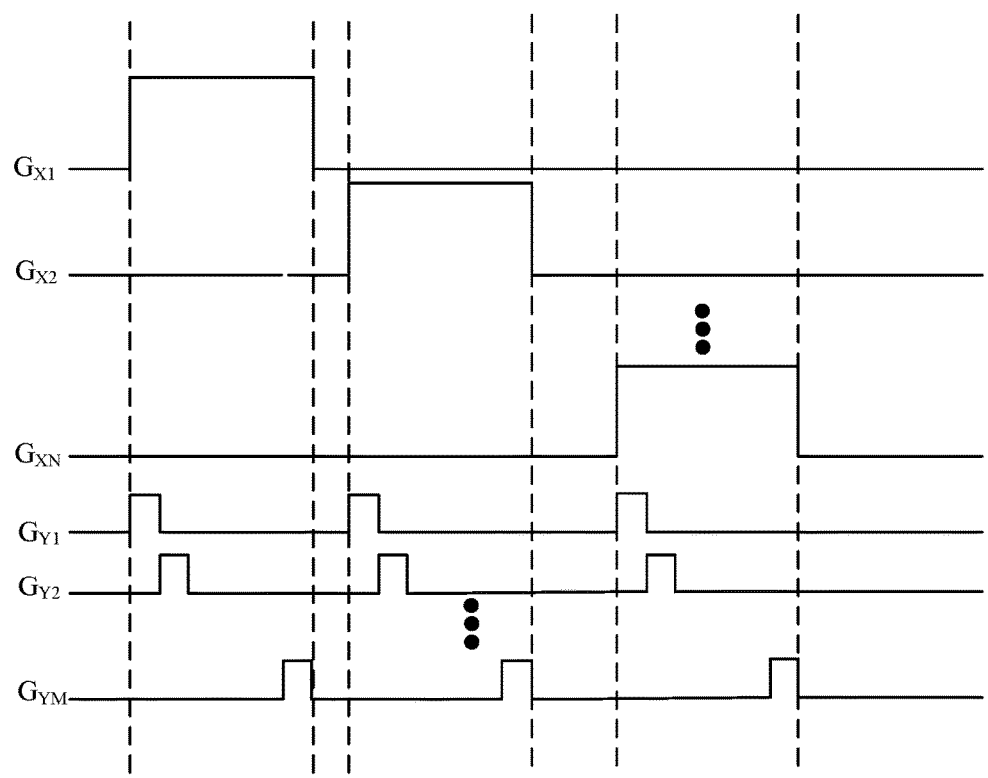
FIG. 18 is a waveform diagram of a scanning time sequence in a display phase according to an embodiment of the present invention.

In the waveform diagram of the time sequence shown in FIG. 18, a scanning sequence for the first gate lines is to scan from the gate line X1 to the gate line XN in the column direction one by one. A scanning signal $G_{X1}$ is provided to scan the gate line X1, and a scanning signal $G_{X2}$ is provided to scan the gate line X2, and so forth, a scanning signal $G_{XN}$ is provided to scan the gate line XN. In a case that any scanning signal is in high level, the first gate line correspondingly connected to the scanning signal is in a scanning state, and a time sequence period of the high-level signal is a scanning duration.

With respect to any first gate line in a scanning state, all second gate lines are scanned within a time sequence period for scanning the first gate line. In the waveform diagram of the time sequence shown in FIG. 18, a scanning sequence for the second gate lines is to scan from the gate line Y1 to the gate line YM in the row direction one by one. A scanning signal $G_{Y1}$ is provided to scan the gate line Y1, a scanning signal $G_{Y2}$ is provided to scan the gate line Y2, and so forth, a scanning signal $G_{YM}$ is provided to scan the gate line YM. When the second gate lines are scanned, in a case that any scanning signal is in high level, the second gate line correspondingly connected to the scanning signal is in a scanning state.

In an embodiment of the present invention, taking an NMOS transistor as an example of the transistor, the NMOS transistor is switched on in high level, and is switched off in low level. A transistor corresponding to a pixel unit connected between a first gate line and a second gate line is switched on only in a case that each of scanning signals of the first gate line and the second gate line is in high level, so that the pixel unit is electrically connected with the pressure sensing electrode, to charge the pixel unit by the wiring unit. The transistor in the embodiment of the present invention may also be a PMOS. In this case, the PMOS is switched on in low level, and is switched off in high level. A level signal for a driving process corresponding to the PMOS is level-inverted with respect to the level signal for the driving process corresponding to the NMOS, and the driving principle for the PMOS is similar to that for the NMOS, which is not described here.

In a display phase, the second gate lines 14 may be scanned at first by the scanning circuit S12, and the first gate lines 13 are scanned by the scanning circuit S11 based on scanning states of the second gate lines 14, to charge the pixel unit. In this case, a waveform diagram of scanning time sequence of the driving method in the display phase is as shown in FIG. 19, which is another waveform diagram of scanning time sequence in the display phase according to an embodiment of the present invention.

Figure 19:
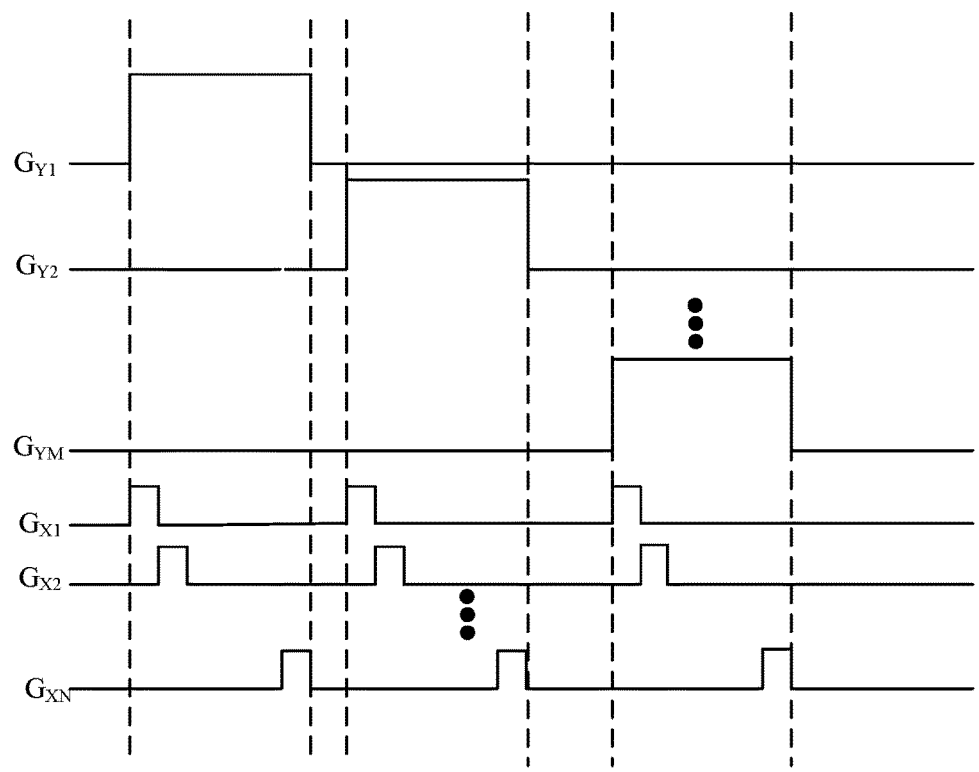
FIG. 19 is a waveform diagram of a scanning time sequence in a display phase according to an embodiment of the present invention.

A difference between the waveform of time sequence in FIG. 19 and the waveform of time sequence in FIG. 18 is that a scanning sequence for the first gate lines and the second gate lines is different. A charging principle for the pixel unit based on the waveform of time sequence shown in FIG. 19 may refer to the embodiment shown in FIG. 18, which is not described here.

Figure 20:
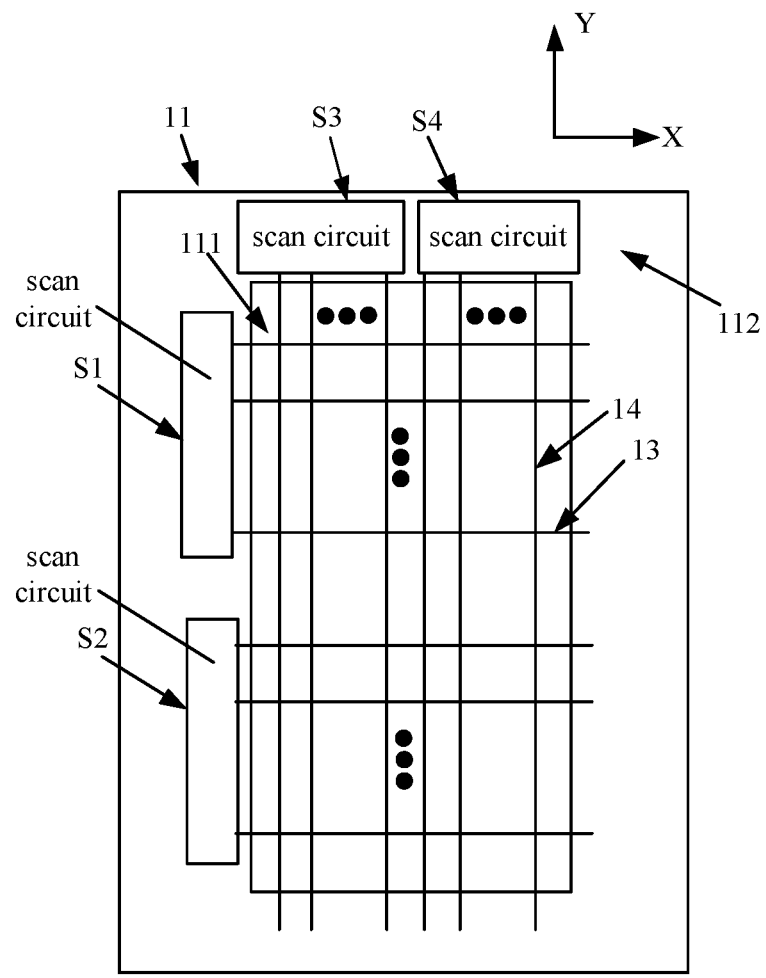
FIG. 20 is a schematic structural diagram of an array substrate according to an embodiment of the present invention.

In the driving method according to an embodiment of the present invention, in the display phase, it may be set to simultaneously scan two first gate lines. In the display phase, it may be set to simultaneously scan two second gate lines, to increase a response speed. In this case, in order to realize the driving method, the driving method is as shown in FIG. 20, which is a schematic structural diagram of another array substrate according to an embodiment of the present invention. The array substrate includes a scanning circuit S1, a scanning circuit S2, a scanning circuit S3 and a scanning circuit S4 arranged in the border region 112 of the substrate 11. The first gate lines 13 are scanned by two scanning circuits, and the second gate lines 14 are scanned by two scanning circuit, thereby effectively increasing the response speed.

The scanning circuit S1 is connected to some of the first gate lines 13, and the scanning circuit S2 is connected to the other ones of the first gate lines 13. The scanning circuit S3 is connected to some of the second gate lines 14, and the scanning circuit S4 is connected to the other ones of the second gate lines 14.

In a pressure sensing phase, the scanning circuit S1 and the scanning circuit S2 provide, to all of the first gate lines 13, voltage signals for controlling the transistors to be switched off, and the scanning circuit S3 and the scanning circuit S4 provide, to all of the second gate lines 14, voltage signals for controlling the transistors to be switched off. In this way, transistors corresponding to all pixel units in the display region 111 are switched off, and each of the pixel units is insulated from the wiring unit. In this case, a direct-current voltage signal is inputted to the wiring unit, and pressure detection is performed based on an electric signal outputted from the wiring unit.

Assumed that each of M and N is an even number, N=2n, and M=2m, where m and n are positive integers. Assumed that in a direction opposite to the column direction Y, first n first gate lines 13 include a gate line X1 to a gate line Xn, and last n first gate lines 13 include a gate line Xn+1 to a gate line X2n. In the row direction X, first m second gate lines 14 include a gate line Y1 to a gate line Ym, and last m first gate lines 14 include a gate line Ym+1 to a gate line Y2m.

In the display phase, the first gate lines 13 are scanned at first by the scanning circuit S1 and the scanning circuit S2, and the second gate lines 14 are scanned by the scanning circuit S3 and the scanning circuit S4 based on scanning states of the first gate lines 13, to charge the pixel unit. In this case, a waveform diagram of scanning time sequence of the driving method in the display phase is shown in FIG. 21, which is a waveform diagram of scanning time sequence in the display phase according to an embodiment of the present invention.

Figure 21:
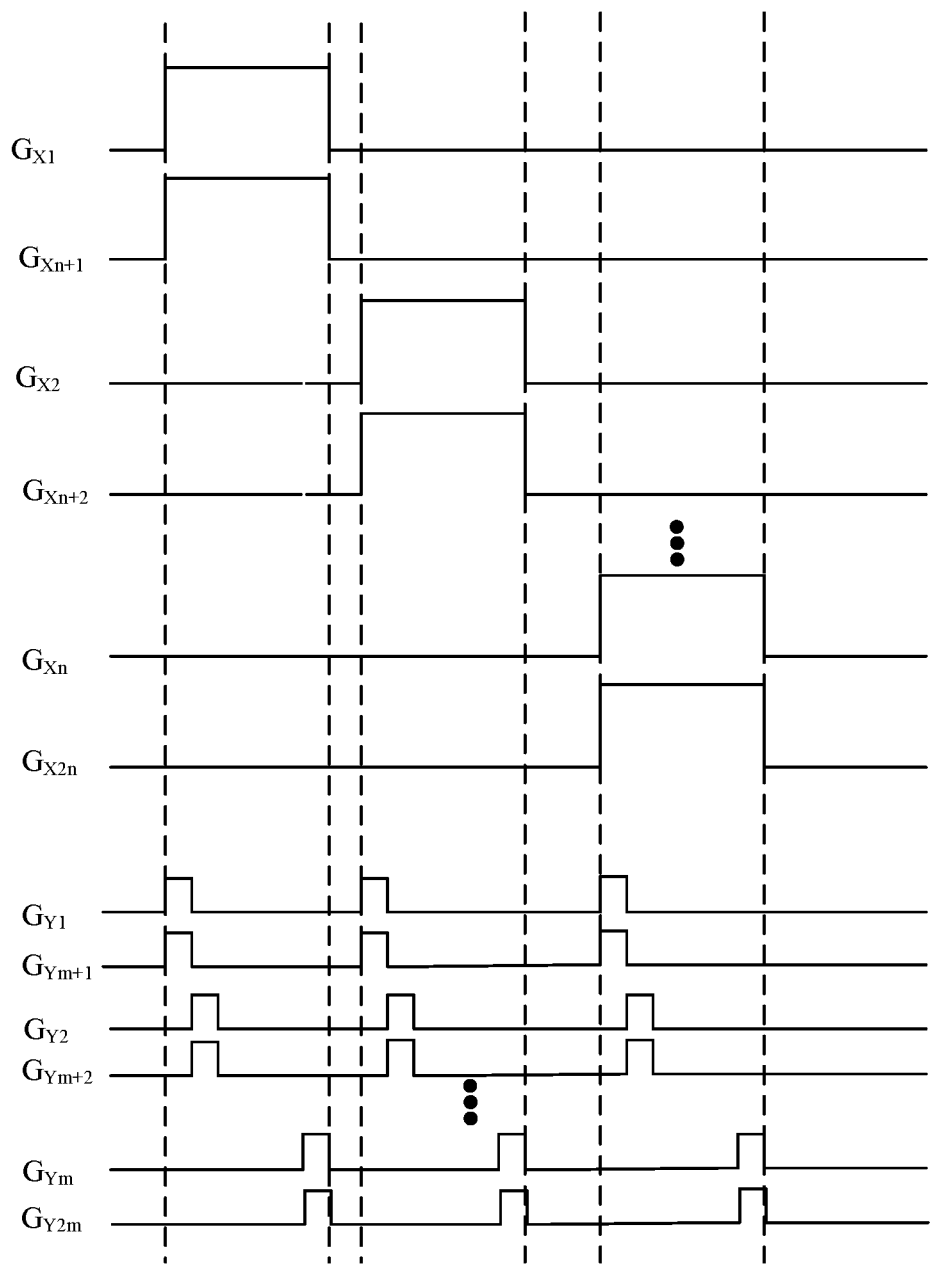
FIG. 21 is a waveform diagram of a scanning time sequence in a display phase according to an embodiment of the present invention.

In the waveform diagram of time sequence shown in FIG. 21, a scanning sequence for the first gate lines is to simultaneously scan two first gate lines every time. The scanning circuit S1 scans the first n first gate lines from the gate line X1 to the gate line Xn in the column direction one by one, and the scanning circuit S2 scans the last n first gate lines from the gate line Xn+1 to the gate line X2n in the column direction one by one. A scanning signal $G_{X1}$ is provided to scan the gate line X1, and a scanning signal $G_{Xn+1}$ is provided to scan the scanning line Xn+1, with a scanning time sequence for the gate line X1 being the same as scanning time sequence for the gate line Xn+1. A scanning signal $G_{X2}$ is provided to scan the gate line X2, and a scanning signal $G_{Xn+2}$ is provided to scan the gate line Xn+2, with a scanning time sequence for the gate line X2 being the same as scanning time sequence for the gate line Xn+2. And so forth, a scanning signal $G_{Xn}$ is provided to scan the gate line Xn, and a scanning signal $G_{X2n}$ is provided to scan the gate line X2n, with a scanning time sequence for the gate line Xn being the same as that for the gate line X2n.

In a time sequence period for simultaneously scanning any two first gate lines, all second gate lines are scanned. In a waveform diagram of time sequence shown in FIG. 21, a scanning sequence for the second gate lines is to simultaneously scan two second gate lines every time. The scanning circuit S3 scans the first m second gate lines from the gate line 1 to the gate line Ym in the row direction one by one, and the scanning circuit S4 scans the last m second gate lines from the gate line Ym+1 to the gate line Y2m one by one.

A scanning signal $G_{Y1}$ is provided to scan the gate line Y1, a scanning signal $G_{Y2}$ is arranged to scan the gate line Y2, and so forth, a scanning signal $G_{YM}$ is provided to scan the gate line YM. When the second gate lines are scanned, in a case that any scanning signal is in high level, a second gate line connected to the scanning signal is in a scanning state. A scanning signal $G_{Y1}$ is provided to scan the gate line Y1, and a scanning signal $G_{Ym+1}$ is provided to scan the gate line Ym+1, with a scanning time sequence for the gate line Y1 being the same as that of the gate line Ym+1. A scanning signal $G_{Y2}$ is provided to scan the gate line Y2, and a scanning signal $G_{Ym+2}$ is provided to scan the gate line Ym+2, with a scanning time sequence for the gate line Y2 being the same as that of the gate line Ym+2. And so forth, a scanning signal $G_{Ym}$ is provided to scan the gate line Ym, a scanning signal $G_{Y2m}$ is provided to scan the gate line Y2m, with a scanning time sequence for the gate lime Ym being the same as that of the gate line Y2m.

Similarly, a transistor corresponding to a pixel unit between a first gate line and a second gate line is switched on only in a case that each of scanning signals of the first gate line and the second gate line is in high level, so that the pixel unit is conducted with the pressure sensing electrode, to charge the pixel unit by the wiring unit.

In the display phase, the second gate lines 14 are scanned at first by the scanning circuit S3 and the scanning circuit S4, and the first gate lines 13 are scanned by the scanning circuit S1 and the scanning circuit S2 based on scanning states of the second gate lines 14, to charge the pixel unit. In this case, a waveform diagram of scanning time sequence of the driving method in the display phase is as shown in FIG. 22, which is another waveform diagram of scanning time sequence in the display phase according to an embodiment of the present invention.

Figure 22:
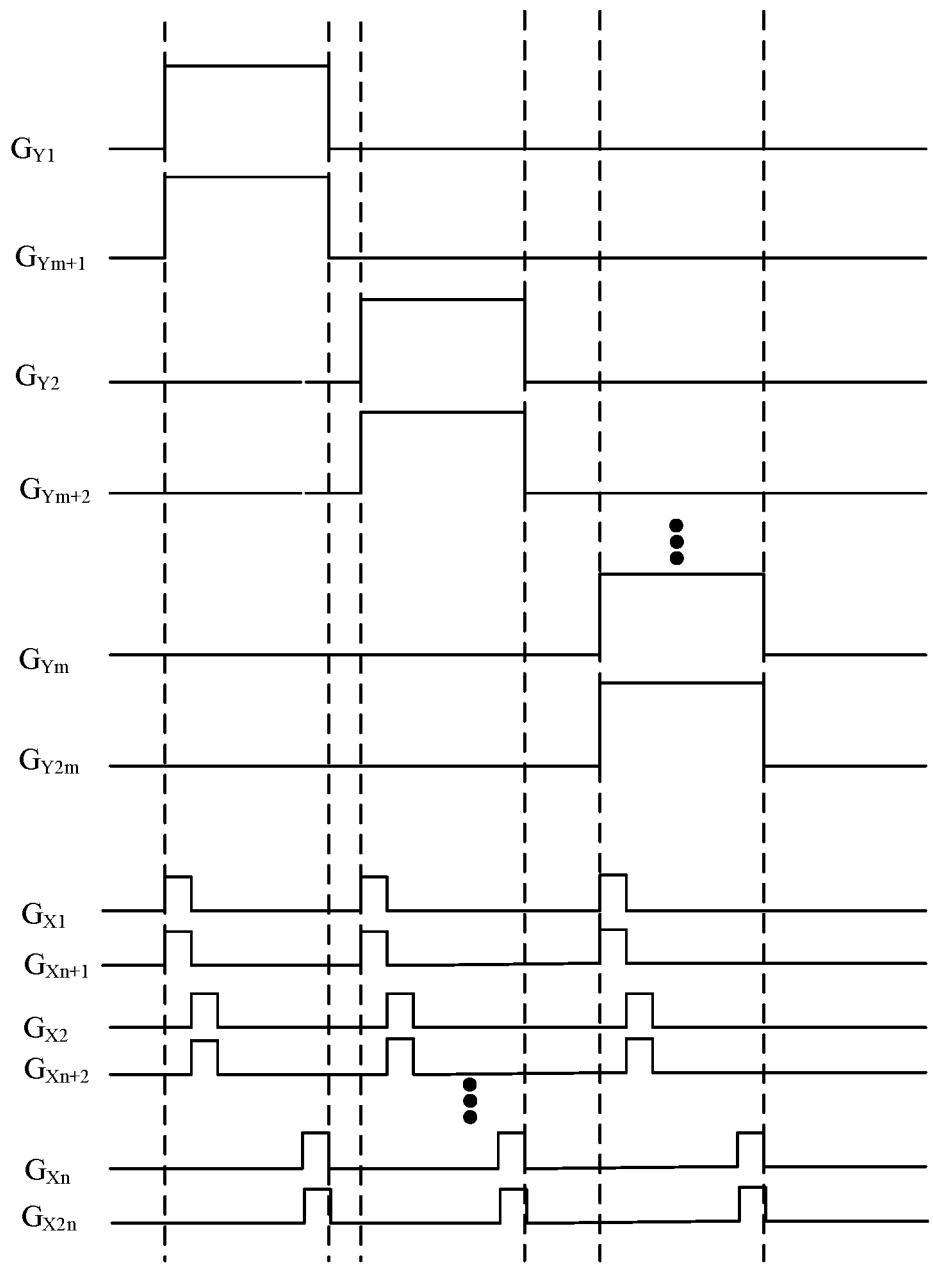
FIG. 22 is a waveform diagram of a scanning time sequence in a display phase according to an embodiment of the present invention.

A difference between the waveform of time sequence in FIG. 22 and the waveform of time sequence in FIG. 21 is that a scanning sequence for the first gate lines and the second gate lines is different. A charging principle for the pixel unit based on the waveform of time sequence shown in FIG. 22 may refer to the embodiment shown in FIG. 21, which is not described here.

It can be seen from the above that the driving method according to the embodiment of the present invention can implement display driving and pressure detection driving for the array substrate and the display panel, and image display and pressure detection can be realized by the wiring unit without additionally providing a pressure sensor, thereby reducing production cost and the thickness of the panel.

Various parts of the specification are described in a progressive way, and each part lays emphasis on differences from other parts. For the same or similar parts between various parts, one may refer to the description of other parts. The driving method according to the embodiments of the present invention corresponds to the array substrate according to the embodiments of the present invention, and therefore, description for the driving method is simple, related parts can refer to the array substrate according to the embodiments.

According to the above description of the disclosed embodiments, those skilled in the art can implement or practice the present disclosure. Many changes to these embodiments are apparent for those skilled in the art, and general principles defined herein may be implemented in other embodiments without departing from the spirit or scope of the present disclosure. Hence, the present disclosure is not limited to the embodiments disclosed herein, but is to conform to the widest scope in accordance with the principles and novel features disclosed herein.

The invention claimed is:

1. An array substrate, comprising:
    a substrate comprising a display region and a border region surrounding the display region;
    a plurality of pixel units arranged in the display region in an array;
    a data-line metal layer arranged in the display region, wherein the data-line metal layer comprises a plurality of wiring units arranged in an array, with each of the plurality of wiring units corresponding to a plurality of the plurality of pixel units in a direction perpendicular to the substrate, and a plurality of the plurality of pixel units corresponding to a same wiring unit being electrically connected to the wiring unit via transistors, respectively;
    a plurality of first gate lines arranged in parallel and extending in a row direction; and
    a plurality of second gate lines arranged in parallel and extending in a column direction,
    wherein the plurality of first gate lines and the plurality of second gate lines are arranged to control conduction states of the transistors,
    the wiring unit is arranged to detect pressure touch, and in a pressure sensing phase, the plurality of first gate lines and the plurality of second gate lines control the transistors to be switched off, and the plurality of wiring units are arranged to input direct-current voltage signals, and pressure detection is performed based on electric signals outputted from the wiring units;
    each of the plurality of wiring units comprises a bridge electrode, a power supply terminal and a detection terminal; and
    the array substrate further comprises a power supply line electrically connected to the power supply terminal and a detection line electrically connected to the detection terminal, with the plurality of pixel units corresponding to each of the plurality of wiring units being electrically connected to the bridge electrode via the transistors, respectively;
    the bridge electrode comprises a first sub-bridge electrode, a second sub-bridge electrode, a third sub-bridge electrode and a fourth sub-bridge electrode;
    the power supply line comprises a first power supply line and a second power supply line; and
    the detection line comprises a first detection line and a second detection line,
    the first sub-bridge electrode and the second sub-bridge electrode connected in series are connected between the first power supply line and the second power supply line, the third sub-bridge electrode and the fourth sub-bridge electrode connected in series are connected between the first power supply line and the second power supply line, the first detection line is connected between the third sub-bridge electrode and the fourth sub-bridge electrode, and the second detection line is connected between the first sub-bridge electrode and the second sub-bridge electrode.

2. The array substrate according to claim 1, wherein the first gate lines intersect with the second gate lines in an insulative manner.

3. The array substrate according to claim 1, wherein the plurality of wiring units comprises first data lines extending in the row direction and second data lines extending in the column direction, with the first data lines and the second data lines being electrically connected alternately.

4. The array substrate according to claim 1, wherein in a display phase, the plurality of first gate lines and the plurality of second gate lines receive scanning signals to control the transistors to be switched on, and the plurality of wiring units are arranged to input data signals to charge the pixel units electrically connected to the transistors.

5. The array substrate according to claim 1, wherein each of the first power supply line, the second power supply line, the first detection line and the second detection line is arranged in the data-line metal layer.

6. The array substrate according to claim 1, wherein the array substrate further comprises a wiring metal layer, and at least one of the first power supply line, the second power supply line, the first detection line and the second detection line is arranged in the wiring metal layer and is electrically connected to respective one of the plurality of wiring units via a via hole.

7. The array substrate according to claim 6, wherein the wiring metal layer is arranged on a surface of the substrate facing away from the pixel units.

8. The array substrate according to claim 1, wherein each of the first sub-bridge electrode, the second sub-bridge electrode, the third sub-bridge electrode and the fourth sub-bridge electrode comprises a plurality of first data lines extending in the row direction and a plurality of second data lines extending in the column direction; and
    in a same sub-bridge electrode, the first data lines and the second data lines are electrically connected alternately.

9. The array substrate according to claim 8, wherein the four sub-bridge electrodes in a same bridge electrode are arranged in an array of 2×2;
    in a same bridge electrode, all the second data lines of one of any two adjacent sub-bridge electrodes are arranged in parallel sequentially in the row direction, with each of the first data lines being arranged to connect two adjacent second data lines in the row direction together, and all the first data lines of the other of the any two adjacent sub-bridge electrodes are arranged in parallel sequentially in the column direction, with each of the second data lines being arranged to connect two adjacent first data lines in the column direction together, so that pressure sensing directions of the any two adjacent sub-bridge electrodes are different from each other.

10. The array substrate according to claim 9, wherein in an array of pixel units of the plurality of pixel units corresponding to a same sub-bridge electrode, one or two rows of pixel units are arranged between two adjacent first data lines in the column direction in a case that all the first data lines are arranged in parallel sequentially in the column direction.

11. The array substrate according to claim 10, wherein in a same sub-bridge electrode, one or two rows of pixel units in the array of pixel units are arranged between two adjacent first data lines in the row direction in a case that all the first data lines are arranged in parallel sequentially in the row direction.

12. The array substrate according to claim 9, wherein in an array of pixel units of the plurality of pixel units corresponding to a same sub-bridge electrode, at least one column of pixel units are arranged between two adjacent second data lines in the row direction in a case that all the second data lines are arranged in parallel sequentially in the row direction.

13. The array substrate according to claim 12, wherein in a same sub-bridge electrode, one or two columns of pixel units in the array of pixel units are arranged between two adjacent second data lines in the row direction in a case that all the second data lines are arranged in parallel sequentially in the row direction.

14. The array substrate according to claim 1, wherein power supply lines of all the wiring units are electrically connected together.

15. The array substrate according to claim 1, wherein each of the first gate lines is electrically connected to pixel units in a same row, and each of the second gate lines is electrically connected to pixel units in a same column;
the transistors comprise a first transistor and a second transistor, with a first electrode of the first transistor being electrically connected to a first electrode of the second transistor, a second electrode of the first transistor being electrically connected to the pixel unit, and a second electrode of the second transistor being electrically to the bridge electrode,
wherein the first gate line is electrically connected to a gate of the first transistor, and the second gate line is electrically connected to a gate of the second transistor.

16. The array substrate according to claim 1, wherein the plurality of second gate lines are arranged in a gate-line metal layer;
one of the plurality of first gate lines comprises a first span bridge arranged in a position where one of the plurality of first gate lines intersects with one of the plurality of second gate lines, and first leads arranged on two sides of one of the plurality of second gate lines;
wherein the first leads are arranged in the gate-line metal layer, the first span bridge is arranged to connect the first leads on two sides of a same one of the plurality of second gate lines together, and the first span bridge is arranged in the data-line metal layer.

17. The array substrate according to claim 1, wherein the plurality of first gate lines are arranged in a gate-line metal layer;
one of the plurality of second gate lines comprises a second span bridge arranged in a position where one of the plurality of first gate lines intersects with one of the plurality of second gate lines, and second leads arranged on two sides of one of the plurality of first gate lines;
wherein the second leads are arranged in the gate-line metal layer, the second span bridge is arranged to connect the second leads on two sides of a same one of the plurality of first gate lines together, and the second span bridge is arranged in the data-line metal layer.

18. The array substrate according to claim 1, wherein the plurality of first gate lines are arranged in a gate-line metal layer, the plurality of second gate lines are arranged in a first metal layer, and the first metal layer is insulated from the gate-line metal layer and the data-line metal layer.

19. The array substrate according to claim 1, wherein the plurality of second gate lines are arranged in a gate-line metal layer, the plurality of first gate lines are arranged in a first metal layer, and the first metal layer is insulated from the gate-line metal layer and the data-line metal layer.

20. A display panel, comprising the array substrate according to claim 1.

* * * * *